PORTABLE CRUSHING PLANT

Original Filed April 21, 1966 3 Sheets-Sheet 1

Inventor
John N. Quinn
By Dalrymple & Jones
Attorneys

PORTABLE CRUSHING PLANT

Original Filed April 21, 1966 3 Sheets-Sheet 2

Inventor
John N. Quinn
By Schutten & Jones
Attorneys

PORTABLE CRUSHING PLANT

Original Filed April 21, 1966 3 Sheets-Sheet 3

Inventor
John N. Quinn
By Smith & Jones
Attorney

United States Patent Office

Re. 28,125
Reissued Aug. 20, 1974

28,125
PORTABLE CRUSHING PLANT

John N. Quinn, Madison, Wis., by Johnson Welding & Equipment Co. Inc., Madison, Wis., assignee Original No. 3,409,235, dated Nov. 5, 1968, Ser. No. 544,203, Apr. 21, 1966. Application for reissue May 7, 1973, Ser. No. 358,256
Int. Cl. B02c *13/00, 19/00;* B07b *1/40*
U.S. Cl. 241—76 15 Claims

Matter enclosed in heavy brackets [ ] appears in the original patent but forms no part of this reissue specification; matter printed in italics indicates the additions made by reissue.

This invention relates generally to crushing apparatus and has more particular reference to portable apparatus for processing gravel and producing aggregate or crushed material of substantially uniform size that is especially suited for paving projects.

Apparatus of the general type to which this invention relates is disclosed in Patent No. 3,073,536 issued to John N. Quinn on Jan. 15, 1963. The apparatus of that patent comprises, in general, a crushing plant having primary and secondary crushers, vibratory screens for segregating materials of various sizes as they are processed through the plant, and conveyor means for transferring materials from one part of the apparatus to another, the apparatus being so arranged that it can be mounted on a trailer bed without exceeding legal size limits for highway travel.

While the apparatus of the above mentioned Quinn patent had many advantages over previous portable crushing plants and proved very satisfactory in use, it lacked certain features that were found to be very desirable in many cases; and it is thus the general object of the present invention to provide a portable crushing plant which has these other features as well as having all of the features of the crushing apparatus of the Quinn patent.

More specifically, it is the general object of the present invention to provide a two-stage portable crushing plant which can be mounted on a pair of vehicle chassis that cooperate to provide an elongated fore-and-aft extending frame, and which apparatus is so arranged that materal to be processed is loaded into the plant at the rear end thereof and finished material is discharged at its front end, at an elevation above the level of the frame, to facilitate loading the finished material directly into dump trucks or the like.

Another important object of this invention is to provide a portable crushing plant of the character described which is so arranged that all material is moved in the most expeditious manner toward the discharge end of the plant, without subjecting any material to unnecessary processing or reprocessing.

More specially, it is an object of this invention to provide a portable crushing plant of the character described having primary and secondary crushers and which is so arranged that incoming material of "finished" size is moved substantially directly to the outlet of the plant, incoming material of a size suitable for feeding to the secondary crusher is moved substantially directly to the secondary crusher, and only material too coarse for the secondary crusher is fed to the primary crusher, by which arrangement the full capacity of both crushers is utilized with the utmost efficiency.

It is another specific object of this invention to provide a portable crushing plant of the character described having vibratory screens for segregating material being processed, and wherein the vibratory screens are so arranged that they cooperate with one another and with other elements of the apparatus to pass sorted material as directly as possible to the outlet of the plant, so that material which has been dropped by a particular vibratory screen is not caused to make a second pass over that same vibratory screen, thereby insuring that all vibratory screens are operated at maximum efficiency.

Other and more specific objects of the invention are to provide a portable crushing plant which embodies features that are well recognized as desirable, including the arrangement of the components to provide maximum [accessability] *accessibility* of the primary and secondary crushers to facilitate their repair and maintenance, quick and easy convertability of the plant from transport to operating condition and vice versa, provision for optional separate discharge of powdery materials not desired in the finished material, optional provision for washing finished material, overall dimensions within legal limits for highway transport, low center of gravity, self-contained power drive means, and, of course, high capacity for the size of the plant and its power consumption.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of a physical embodiment of the invention constructed according to the best mode so far devised for the practical application of the principles thereof, and in which:

FIGURE 2b is a view of the front portion of the plant which complements and partially overlaps FIGURE 2a.

Figure 1:
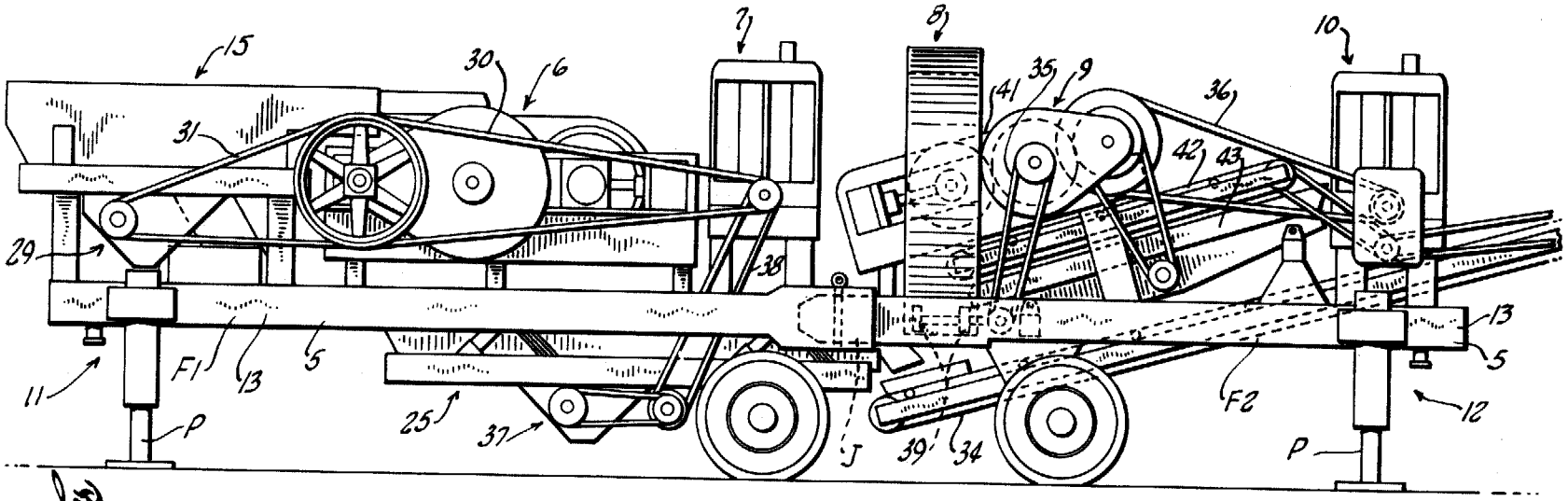
FIGURE 1 is a view in side elevation of the complete portable crushing plant of this invention.
Figure 2A:
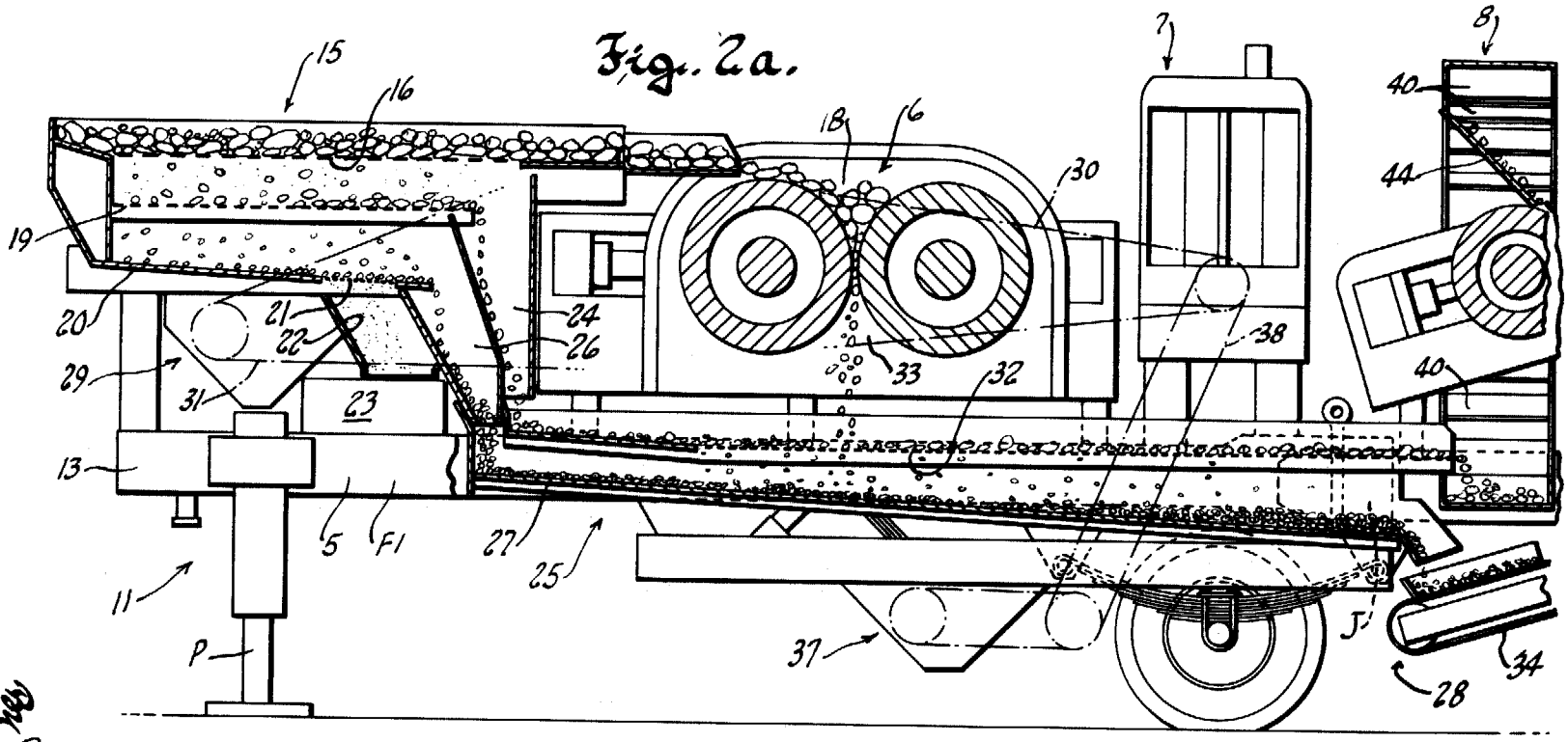
FIGURE 2a is a view of [the] *a* larger scale of the rear portion of the plant, mainly in side elevation but partly in longitudinal section.
Figure 2B:
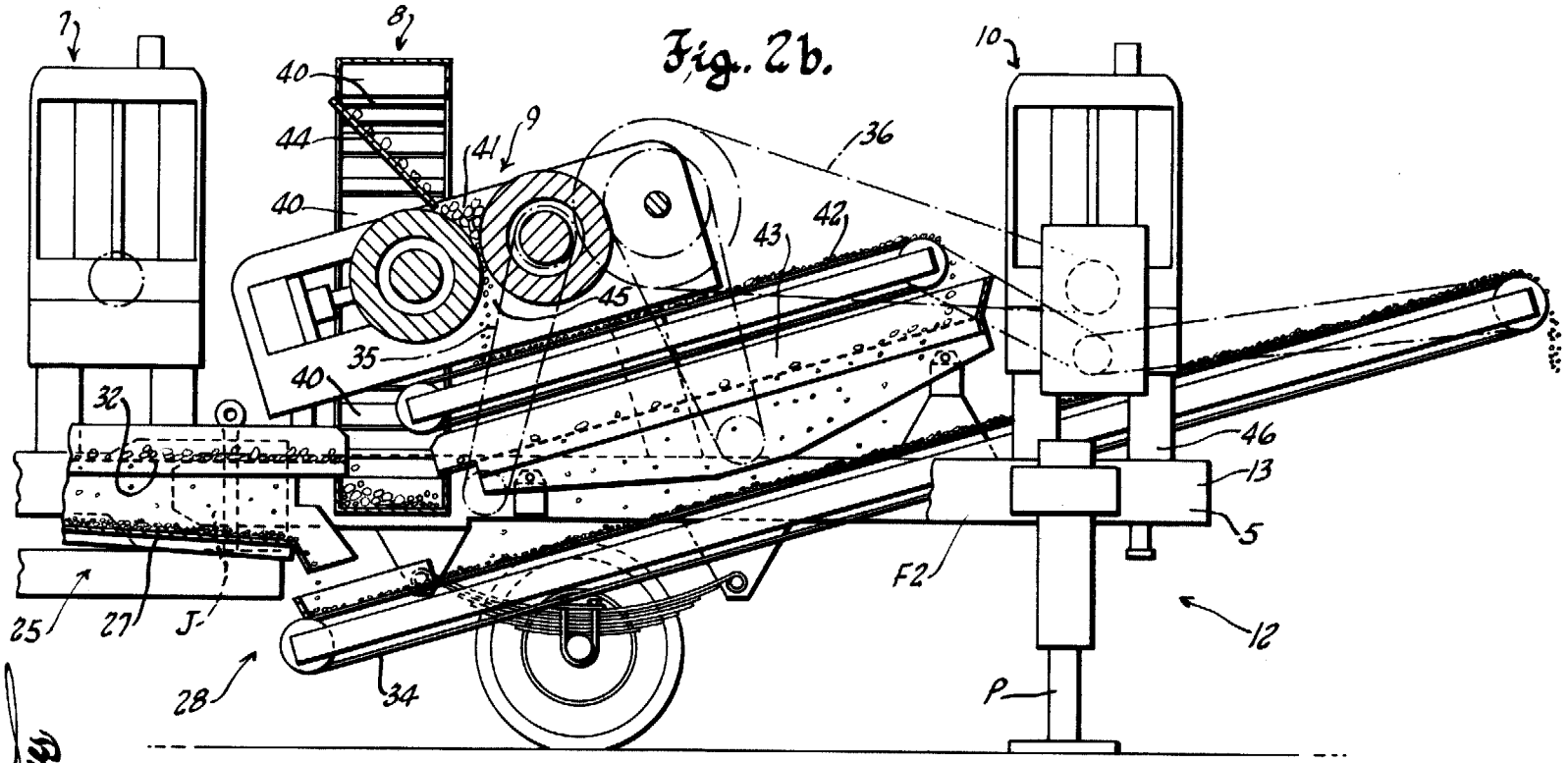

Referring now to the accompanying drawings, the portable crushing plant of this invention comprises, in general, and elongated, generally horizontal, fore-and-aft extending frame 5 upon which are mounted (reading from rear to front) a primary crusher 6, a rear motor 7, an elevator wheel or rotary lift 8, a secondary crusher 9 and a [font] *front* motor 10, together with certain vibratory screens and conveyor means that are designated and described hereinafter.

By way of example the frame 5 is illustrated as comprising the frame sections F1 and F2 of a pair of identical standard trailer vehicles 11 and 12 that are arranged with what would normally be their wheeled rear ends in abutting relationship, and which have their frame sections readily detachably coupled together by laterally opposite medial joints J. The portion of the crushing plant that is carried by each trailer vehicle is self-contained, in that each of the trailer vehicles has a motor 7 or 10 mounted thereon for driving all of the equipment carried by that trailer vehicle. While the two portions of the plant carried by the respective trailer vehicles 11 and 12 are nicely adapted for cooperation with one another as describer hereinafter, it will be apparent that each is also adapted for cooperation with some other type of equipment.

Fifth wheel means (not shown) provide for supporting the end of each trailer vehicle remote from its wheeled end on a tractor for transportation of the plant from one site to another.

Setting up the plant of this invention is essentially a matter of parking the trailer vehicles 11 and 12 on a substantially level surface, in aligned back-to-back relation, coupling their frame sections together, and then supporting their remote ends with sutable jacks or props P. The plant can be transported to a new location by simply backing tractors under their remote ends, uncoupling the joints J, lifting the supports P and towing the trailer vehicles away.

Obviously the plant could be mounted on a single self-supporting trailer having wheels at its opposite ends, or it could be built as a stationary installation.

In any event, the frame 5 comprises transversely spaced beams 13 which extend the entire length of the installation and which are suitably connected by cross beams, not shown, at various locations. The several components of the crushing apparatus are of course carried by these beams.

Material to be processed by the plant is fed onto the top screen 16 of a triple deck vibratory unit 15 which is mounted at the rear of the plant and is driven from the rear motor 7. The top screen of this vibratory unit extends forwardly all the way to the inlet 18 at the top of the primary crusher 6, and is of sufficiently coarse mesh so that it drops all material except particles so large as to require passage through the primary crusher. The intermediate deck 19 of this vibratory unit comprises a finer mesh or finish screen which receives [scalped] material dropped by the top screen, and which *in turn* drops all material except particles large enough to require passage through the secondary crusher. The lowermost deck 20 of the triple vibratory unit, which can be imperforate, thus receives only particles small enough not to need crushing, which drop onto it from the upper and intermediate decks; and if desired the lowermost deck can incorporate a fine mesh screen section 21 through which excessively fine particles such as sand, silt and the like can drop through a chute 22 and onto a conveyor 23 or the like for discharge from the plant. It will be apparent that the triple deck vibratory unit 15 effects an immediate sorting of materials fed into the apparatus, segregating them as material for the primary crusher, material for the secondary crusher, finish material and, if desired, discard material.

As already pointed out, the top deck 16 of the triple vibratory unit feeds carryover material directly into the inlet 18 of the primary crusher. The intermediate screen 19 extends forwardly a lesser distance than the top screen 16 and discharges *carryover material thereon* at its front end into a chute 24 that guides the discharged material onto an intermediate vibratory unit 25, described hereinafter, from which such material is carried to the secondary crusher 9 by means of the elevator wheel 8. The front end of the lower deck 20 of the triple vibratory unit is behind the chute 24 and over another chute 26. Carryover material discharged from the lowermost deck 20 is guided by the chute 26 onto the rear element 27 of conveyor means 28 by which material of finish size is carried to and discharged from the front of the apparatus.

It will be understood that the front end portions of each of the three decks or screens of the triple vibratory unit can be imperforate, and that the three decks can be constructed and arranged according to known practice to be vibrated fore-and-aft in unison by suitable vibratory transmission means, indicated generally by 29, driven from the motor 7 as by means of endless belts 30 and 31.

If desired, the common wall between the chutes 22 and 26 can comprise a flip-flop gate (not shown) which can be adjusted to divert to the chute 26 all material from the lower deck of the triple vibratory unit.

The primary crusher 6 is illustrated as a roll crusher, but it will be understood that it could be a jaw or other type of crusher. It is driven, as by means of the endless belt 30, from the rear motor 7, which is illustrated as a gasoline engine mounted at the front of the rear trailer vehicle 11 (i.e., at the rear of that trailer considered in its transport condition).

The intermediate vibratory unit 25 comprises a finish screen 32 which is located substantially at the level of the tops of the beams 13 and between them, and extends forwardly from beneath the front chute 24, under the primary crusher 6 and the motor 7, to discharge *carryover material thereon* into the lower portion of the elevator wheel 8. Hence material dropping through the outlet 33 in the bottom of the primary crusher falls directly onto the intermediate vibratory unit, joining with carryover material deposited thereon from the middle screen 19 of the triple deck vibratory unit; and the intermediate screen 32 serves to vibratorily transmit [such material] *carryover material thereon* to the elevator wheel which in turn feeds it into the secondary crusher. However, a certain amount of the material issuing from the primary crusher is of small enough size not to require passage through the secondary crusher, and the intermediate vibratory screen 32 therefore has a mesh which passes such finish size material, dropping it onto the rear conveyor element 27 therebeneath.

The rear conveyor element 27 can comprise a part of the intermediate vibratory unit. It is located between the beams 13 and near their lower edges, and it extends forwardly from beneath the *outlet of the* middle chute 26 to have its discharge end portion directly over the rear end portion of an endless conveyor element 34 *which comprises the front element of the conveyor means 28.*

The intermediate vibratory unit 25 and the rear conveyor element 27 can be actuated for vibration in unison by means of a suitable vibratory transmission 37 which is in turn driven through a belt 38 from the rear motor 7.

Assuming the apparatus is intended for highway transport, the above described units that are powered by the rear motor 7 can all be mounted on the rear trailer vehicle 11, along with the rear motor. The units now about to be described, which can all be mounted on the other trailer vehicle 12, are driven by the front motor 10, which can be a gasoline engine similar to the rear motor 7.

The elevator wheel or rotary lift 8 is a conventional component or crushing plants of the type with which this invention is concerned, although it has a novel relationship with the secondary crusher 9, as described hereinafter. The elevator wheel is supported by rollers 39, near the rear of the front trailer vehicle 12, for rotation on a fore-and-aft extending axis. One set of rollers is driven by a belt 35 connecting with a power takeoff on the secondary crusher 9, which in turn is driven from the engine 10 by a belt 36. The lower portion of the elevator wheel is below the level of the intermediate vibratory unit 25, to receive material discharged therefrom, and above the level of the rear end portion of the endless front conveyor element 34. The elevator wheel has large openings in its opposite axial faces and has a series of circumferentially adjacent inwardly opening pockets 40 arranged about its peripheral portion by which material is carried upwardly as the wheel rotates and from each of which material is spilled as the pocket nears the top of its orbit.

The secondary crusher 9, which is illustrated as being of the roller type, is so mounted that it projects through the central portion of the elevator wheel, to have its front end portion disposed in front of the wheel and its inlet 41 closely adjacent to the plane of the rear edge of the wheel. It is set at a forward and upward inclination to provide a triangular or wedge shaped space beneath it in which are accommodated an upper endless conveyor 42 and a front vibratory unit 43, both of which are described hereinafter.

A chute 44 is preferably mounted on top of the secondary crusher, extending obliquely across the upper portion of the elevator wheel to guide material spilled out of the pockets 40 in the wheel downwardly and forwardly directly into the inlet 41 of the secondary crusher. The chute 44 could be otherwise mounted, as from the elevator wheel superstructure, and could be vibratory, especially if it has a low inclination owing to a substantial lengthwise spacing between the elevator wheel and the secondary crusher inlet.

The upper endless conveyor 42 extends obliquely forwardly and upwardly from near the front of the elevator wheel to near the front motor 10, and it receives material from an outlet 45 in the bottom of the secondary crusher and transfers it to the front vibratory unit 43, which extends beneath and substantially parallel to the upper endless conveyor.

The receiving end portion of the front vibratory unit 43 projects a distance forwardly of the front end of the upper endless conveyor 42 so that material falls directly down onto the front vibratory unit from said conveyor. The discharge end portion of the front vibratory unit is in the lower portion of the elevator wheel. The front vibratory unit is a screen of such mesh that all material of finished size drops through it onto the front conveyor element 34 therebeneath, while the carryover material that it feeds into the elevator wheel is of such size as to require recycling through the secondary crusher, to which such material is of course directly transferred by the elevator wheel.

The front conveyor element 34, which is of the endless type, extends at a forward and upward inclination from a receiving zone at its rear that is beneath the level of the beam members 13 and beneath and discharge end of the rear conveyor element 27, to a discharge zone *at the front of the frame* spaced forwardly of the front ends of the beam members and well above their level. Because of the high location of its discharge end, well outboard of the frame structure of the apparatus, the front conveyor element 34 is nicely adapted for direct discharge into dump trucks and the like. The inclined mounting of the secondary crusher and its location within the embrace of the elevator wheel, as described above, and the inclination of the upper endless conveyor 42 and the front vibratory unit 43 that are made possible by such mounting of the secondary crusher, also permit the front conveyor element 34 to be so inclined that its discharge end portion is at the high location just described. Further to provide is at the high location just described. Further to provide adequate height for the front end portion of the front conveyor element, the front motor 10 can be mounted at an elevation above the beam member 13, *and be* supported on them by short struts 46 or the like.

It will be apparent that only finished size material moves on the conveyor means comprised of the rear conveyor element 27 and the front conveyor element 34, and that all material of finished size is moved as directly as possible to that conveyor means. It will also be apparent that suitable spray washing means could be provided at any point along that conveyor means, but preferably over a forward portion of the front conveyor element, in accordance with well known practice in this art.

From the foregoing description taken together with the accompanying drowings it will be apparent that this invention provides a portable crushing plant which can comprise two self-contained trailer vehicles, both within the size limits for legal highway travel, and that the apparatus of this invention, in addition to being unusually compact, features rear end loading and front end discharge, maximum accessibility of the primary and secondary crushers, and high capacity for its size by reason of such arrangement of its elements that all material is moved as directly as possible to the discharge end of the plant without being subjected to any unnecessary processing or reprocessing.

*It is to be understood that the expression "scalped material" appearing in the claims is intended to designate material which has dropped through the mesh of one or the other of the vibratory screens, as distinguished from carryover material that fails to drop through said screens.*

What is claimed as my invention is:

1. In a crushing plant:

(A) means providing a fore-and-aft extending frame;

(B) an elevator carried by the frame intermediate the front and rear ends thereof, said elevator having a low level receiving portion and a higher level discharge portion;

(C) a first crusher mounted on the frame means between the rear end thereof and the elevator and having an inlet at its top and an outlet at its bottom;

(D) means for directing coarse material to be crushed into the inlet of said first crusher;

(E) a first material advancing vibratory screen carried by the frame means and having a receiving portion beneath the outlet of said first crusher and a discharge end portion arranged to feed carryover material vibratory advanced therealong into the receiving portion of the elevator;

(F) a second crusher mounted on the frame means adjacent to the elevator and having an inlet in its top and an outlet at its bottom;

(G) means for conducting material from the discharge portion of the elevator into the inlet of the second crusher;

(H) first conveyor means having a receiving portion beneath the outlet of the second crusher and a discharging portion spaced forwardly from its receiving portion;

(I) a second vibratory screen having a receiving portion beneath the discharging portion of the first conveyor means and having a discharge end portion arranged to feed carryover materials vibratory advanced therealong into the receiving portion of the elevator;

(J) and second conveyor means extending forwardly beneath said first vibratory screen, the elevator and the second vibratory screen, for receiving finished materials from said vibratory screens, and having a discharging end portion located at the front end of the frame means.

2. The crushing plant of claim 1, further characterized in that the discharging portions of said first and second conveyor means are disposed at levels substantially higher than the remainder of said conveyor means.

3. The crushing plant of claim 1, further characterized by:

(A) said means for directing coarse material into the inlet of the first crusher comprising an upper coarse mesh vibratory screen;

(B) and vibratory means below said coarse mesh screen to receive materials passing therethrough, said last designated vibratory means being adapted to separate materials of finished size from the scalped material received from the coarse mesh screen and to discharge the materials of finished size directly over said second conveyor means.

4. The crushing plant of claim 3, wherein said last designated vibratory means comprises a lower screen adapted to pass materials of finished size and to vibratorily conduct carryover material thereon onto said first vibratory screen.

5. The crushing plant of claim 1, further characterized by said means for directing coarse material to be crushed into the inlet of the first crusher comprising:

(A) coarse mesh uppermost material advancing vibratory screen means having a receiving portion for ungraded material fed into the plant and a discharging end portion arranged to feed into the inlet of the first crusher;

(B) finish mesh material advancing vibratory screen means beneath said uppermost vibratory screen means to receive material which falls through the latter and arranged to discharge material larger than finish size onto said first vibratory screen unit; and (C) a low level material advancing vibratory means beneath said finish mesh vibratory screen means and arranged to discharge materials of finish size which fall through the latter onto said second conveyor means, whereby materials of finish size fed to the plant can be transferred to the second conveyor means in bypass relation to the crushers and said first and second vibratory screens.

6. The crushing plant of claim 1 further characterized by said second conveyor means comprising:

(A) a rear conveyor element extending substantially horizontally forwardly and having a discharge portion adjacent to the elevator wheel and beneath the level of the bottom thereof; and (B) an endless front conveyor element having its rear end portion beneath the discharge portion of the rear conveyor element and which is forwardly and upwardly inclined toward its discharging front end portion.

7. The crushing plant of claim 6 further characterized by said frame means comprising:

(A) a first vehicle chassis upon which are mounted
(1) the first crusher,
(2) said means for directing material into the inlet of the first crusher, and
(3) the rear conveyor element; and (B) a second vehicle chassis upon which are mounted
(1) the elevator,
(2) the second crusher,
(3) the first conveyor means,
(4) the second vibratory screen, and
(5) the endless front conveyor element.

8. The apparatus of claim 1, further characterized by:

(A) said elevator comprising a wheel constrained to rotate on a fore-and-aft axis; and (B) means mounting the second crusher on the frame with the second crusher extending axially through the elevator wheel.

9. The apparatus of claim 8, further characterized by:

(A) the second crusher being inclined forwardly and upwardly; and (B) said first conveyor means and said second vibratory screen both being forwardly and upwardly inclined and partly disposed in the space beneath the front portion of the second crusher.

10. In a crushing plant having a generally horizontal fore-and-aft extending frame:

(A) an elevator wheel mounted on the frame for rotation about a fore-and-aft extending axis and which is adapted to lift material from one level to another;

(B) a primary crusher mounted on the frame at one side of the elevator wheel and having an inlet at its top and an outlet at its bottom;

(C) means for moving material substantially lengthwise of the frame from the outlet of the primary crusher into the lower portion of the elevator wheel;

(D) a secondary crusher having an inlet at its top and an outlet at its bottom;

(E) means mounting the secondary crusher on the frame with a portion of the secondary crusher encompassed by the elevator wheel but with the outlet of the secondary crusher at the other side of the elevator wheel; and (F) means defining a chute in the upper portion of the elevator wheel for guiding material from the elevator wheel to the inlet of the secondary crusher.

11. A crushing plant, characterized by:

(A) means defining a fore-and-aft extending frame;

(B) a crusher mounted on the frame and having an inlet at its top and an outlet at its bottom;

(C) an elevator wheel mounted on the frame for rotation on an axis extending fore-and-aft of the frame, said elevator wheel encircling the rear portion of the crusher and being adapted to lift materials to be crushed from a low level charging zone to a high level discharging zone;

(D) chute means in the wheel for directing materials discharging therefrom into the inlet of the crusher;

(E) first conveyor means on the frame beneath the crusher, for conducting crushed material discharging therefrom to a discharge end of the conveyor means located forwardly of the crusher;

(F) a vibratory screen mounted on the frame under said first conveyor means, to receive material discharging therefrom and to vibratorily conduct material that fails to pass through the screen back to the charging zone of the elevator wheel;

(G) and delivery conveyor means below said screen, to receive scalped material therefrom.

12. The crushing plant of claim 11, wherein said crusher, said first conveyor means, said vibratory screen, and said delivery conveyor means are all inclined upwardly and forwardly.

[13. A crushing plant having a primary crusher and a secondary crusher supported on an elongated frame, one forward and one behind a material elevator having a low level inlet and higher level discharge, said frame also carrying vibratory screens, one located below each crusher, for conducting into the elevator inlet material of larger than finish size discharged by the crushers while allowing material of finish size to pass therethrough, and said frame having thereon means for delivering material discharged from the elevator into the secondary crusher and conveyor means for conducting material of finish size to a delivery zone, said crushing plant being characterized by:

(A) said conveyor means extending lengthwise of the frame beneath both of said vibratory screens to receive materials of finish size from them;

(B) means for receiving material to be processed through the plant and for conducting to the primary crusher only the received material that is of the largest size, said means comprising a vibratory member at an uppermost level having
(1) a coarse mesh screen adapted to pass all but the largest size material and
(2) a discharge portion communicated with the primary crusher;

(C) means for conducting to the secondary crusher only the received material that is of larger than finish size, comprising an intermediate level vibratory member beneath said coarse mesh screen to receive scalped material therefrom and having
(1) a finish screen adapted to support materials of larger than finish size and
(2) a discharge portion communicated with the vibratory screen below the first crusher; and (D) lower level means located beneath said finish screen for conducting scalped material therefrom directly to the conveyor means in by-pass relation to the last mentioned vibratory screen.]

[14. The crushing plant of claim 13, further characterized by:

said conveyor means having its discharge portion at one end of the frame.]

*15. A crushing plant comprising an elongated frame having front and rear ends and having mounted thereon the following components:*

*(A) a material elevator at a location spaced from each end of the frame, said elevator having a low level inlet and higher level discharge;*

*(B) a primary crusher rearwardly of the elevator;*

*(C) a secondary crusher forwardly of the elevator;*

*(D) first and second vibratory screens located below the primary and secondary crushers, respectively, to conduct to the elevator inlet material of larger than finish size discharged by the crushers while allowing material of finish size to pass therethrough;*

*(E) means for conducting material from the elevator discharge to the secondary crusher;*

*(F) conveyor means beneath said first and second screens to receive finish size material therefrom, said conveyor means extending forwardly from the rear portion of the frame to a delivery zone forwardly of and at a level above the front of the frame;*

*(G) triple deck vibratory material receiving unit located behind the primary crusher and comprising an*

*upper coarse mesh screen to support and vibrationally advance carryover material thereon in the forward direction, a finished screen beneath the coarse mesh screen to receive materials that pass therethrough and to support and vibrationally advance carryover materials of larger than finish size in the forward direction, and a lower deck to receive materials of finish size that pass through the mesh of said finish screen and to vibrationally advance said finish size material in the forward direction;*

*(H) means to transfer forwardly advanced carryover material from the coarse mesh screen to the primary crusher;*

*(I) means to effect transfer of the forwardly advanced carryover material from said finish screen to said first vibratory screen in bypass relation to the primary crusher;*

*(J) and means for conducting material of finish size from the forward end of said lower deck to said conveyor means, in bypass relation to said first vibratory screen.*

*16. A crushing plant comprising an elongated frame having front and rear ends and having mounted thereon the following components:*

*(A) a material elevator at a location spaced from each end of the frame, said elevator having a low level inlet and higher level discharge;*

*(B) a primary crusher rearwardly of the elevator;*

*(C) a secondary crusher forwardly of the elevator;*

*(D) first and second vibratory screens located below the primary and secondary crushers, respectively, to conduct to the elevator inlet material of larger than finish size discharged by the crushers while allowing material of finish size to pass therethrough;*

*(E) means for conducting material from the elevator discharge to the secondary crusher;*

*(F) conveyor means beneath said first and second screens to receive finish size material therefrom, said conveyor means extending forwardly from the rear portion of the frame to a delivery zone forwardly of and at a level above the front of the frame;*

*(G) a double deck vibratory material receiving unit located behind the primary crusher and comprising an upper coarse mesh screen to support and vibrationally advance carryover material thereon in the forward direction, and a finish screen beneath the coarse mesh screen to receive materials that pass therethrough and to support and vibrationally advance carryover materials of larger than finish size in the forward direction;*

*(H) means to transfer forwardly advanced carryover material from the coarse mesh screen to the primary crusher;*

*(I) means to effect transfer of the forwardly advanced carryover material from said finish screen to said first vibratory screen in bypass relation to the primary crusher;*

*(J) means located geneath said finish screen for conducting material of finish size dropped thereby to said conveyor means, in bypass relation to said first vibratory screen;*

*(K) a front conveyor element located beneath said secondary vibratory screen and having its front end located a distance forwardly of the front of the frame and at a substantial elevation thereabove;*

*(L) and a rear conveyor element located beneath said first vibratory screen and having its front end located over a rear portion of said front conveyor element to discharge materials thereonto.*

*17. A crushing plant having a primary crusher and a secondary crusher supported on an elongated frame, one forward and one behind a material elevator having a low level inlet and higher level discharge, said frame also carrying vibratory screens, one located below each crusher, for conducting into the elevator inlet material of larger than finish size discharged by the crushers while allowing material of finish size to pass therethrough, and said frame having thereon means for delivering material discharged from the elevator into the secondary crusher and conveyor means for conducting material of finish size to a delivery zone, said crushing plant being characterized by:*

*(A) said conveyor means extending lengthwise of the frame beneath both of said vibratory screens to receive materials of finish size from them;*

*(B) means for receiving material to be processed through the plant and for conducting to the primary crusher only the received material that is of the largest size, said means comprising a vibratory member at an uppermost level having*

*(1) a coarse mesh screen adapted to pass all but the largest size material and*

*(2) a discharge portion communicated with the primary crusher;*

*(C) means for conducting to the secondary crusher only the received material that is of larger than finish size, comprising an intermediate level vibratory member beneath said coarse mesh screen to receive scalped material therefrom and having*

*(1) a finish screen adapted to support materials of larger than finish size and*

*(2) a discharge portion communicated with the vibratory screen below the first crusher;*

*(D) lower level means located beneath said finish screen for conducting scalped material therefrom directly to the conveyor means in by-pass relation to the last mentioned vibratory screen; and*

*(E) said conveyor means having its discharge portion at one end of the frame.*

References Cited

The following references, cited by the Examiner, are of record in the patented file of this patent or the original patent.

UNITED STATES PATENTS

| | | | |
|---|---|---|---|
| 3,226,043 | 12/1965 | Bowman | 241—101.7 X |
| 2,001,549 | 5/1935 | Sandy | 241—76 |
| 2,276,333 | 3/1942 | Ovestrud | 241—76 X |
| 2,593,353 | 4/1952 | Shelton | 241—101 |
| 3,016,203 | 1/1962 | Sears et al. | 241—101 X |
| 3,073,536 | 1/1963 | Quinn | 241—76 |

FOREIGN PATENTS 761,514 12/1952 Germany.

OTHER REFERENCES

Hewitt-Robins Catalog 3403–A, copyright 1966.

Denver Equipment Company, Bulletin No. C12–B16, 4 pp., class 241 (Mobile Crusher Digest).

ROY LAKE, Primary Examiner

E. F. DESMOND, Assistant Examiner

U.S. Cl. X.R.

241—80, 101.7, 152 A

UNITED STATES PATENT OFFICE

CERTIFICATE OF CORRECTION

Patent No. RE 28,125 Dated August 20, 1974

Inventor(s) John N. Quinn

It is certified that error appears in the above-identified patent and that said Letters Patent are hereby corrected as shown below:

Col. 2: Line 35, "view of" should read --view on--

Line 62, "describer" should read --described--

Col. 4: Line 38, "or" should read --on--

Col. 5: Line 24, "beneath and" should read --beneath the--

Lines 38-39, "Further to provide is at the high location just described." should be deleted.

Line 54, "drowings" should read --drawings--

Col. 6: Lines 11-12, "vibratory" should read --vibratorily--

Col. 8: Line 74, "a" should be inserted before "triple"

Col. 9: Line 58, "geneath" should read --beneath--

Line 63, "secondary" should read --second--

Signed and sealed this 19th day of November 1974.

(SEAL)
Attest:

McCOY M. GIBSON JR.
Attesting Officer

C. MARSHALL DANN
Commissioner of Patents